E. KENNEDY.
PLUMBING DEVICE.
APPLICATION FILED MAY 18, 1914.
1,155,820.
Patented Oct. 5, 1915.
2 SHEETS—SHEET 2.
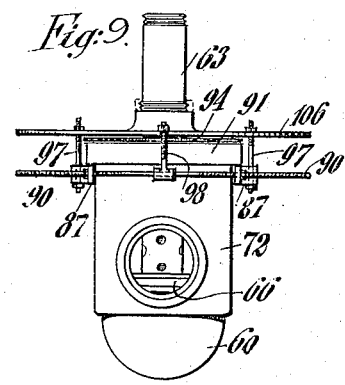
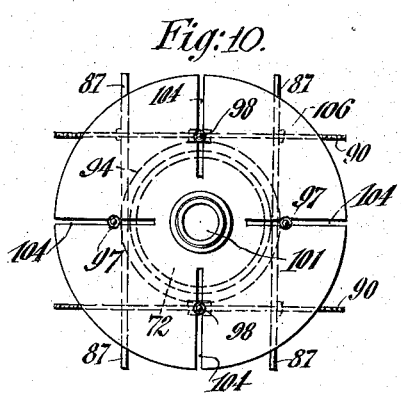
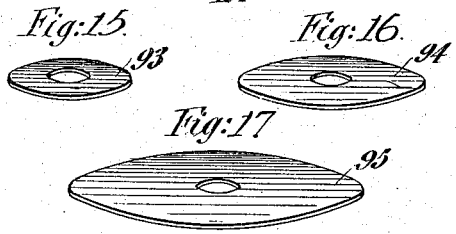
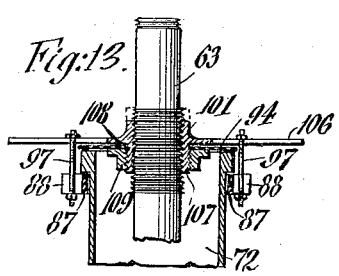
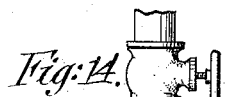
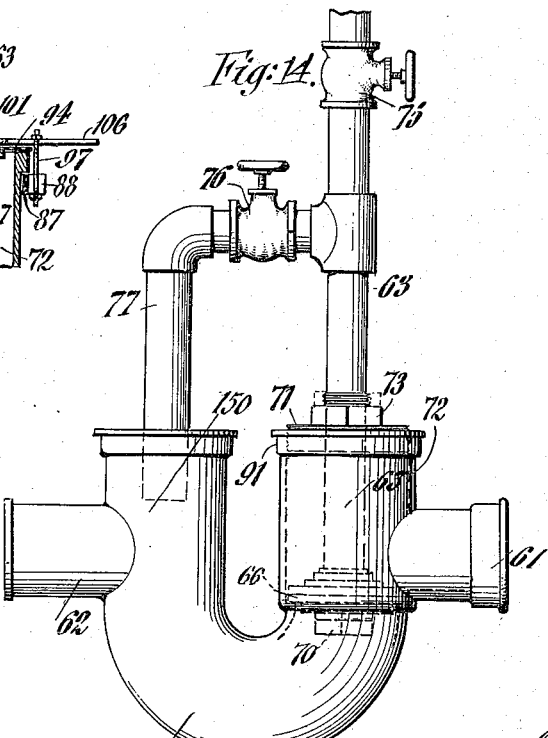
Witnesses:
Jos. Bestans
H. Hogg
Inventor
Edward Kennedy
By his Attorney
Carl P. Goepel
COLUMBIA PLANOGRAPH CO., WASHINGTON, D. C.

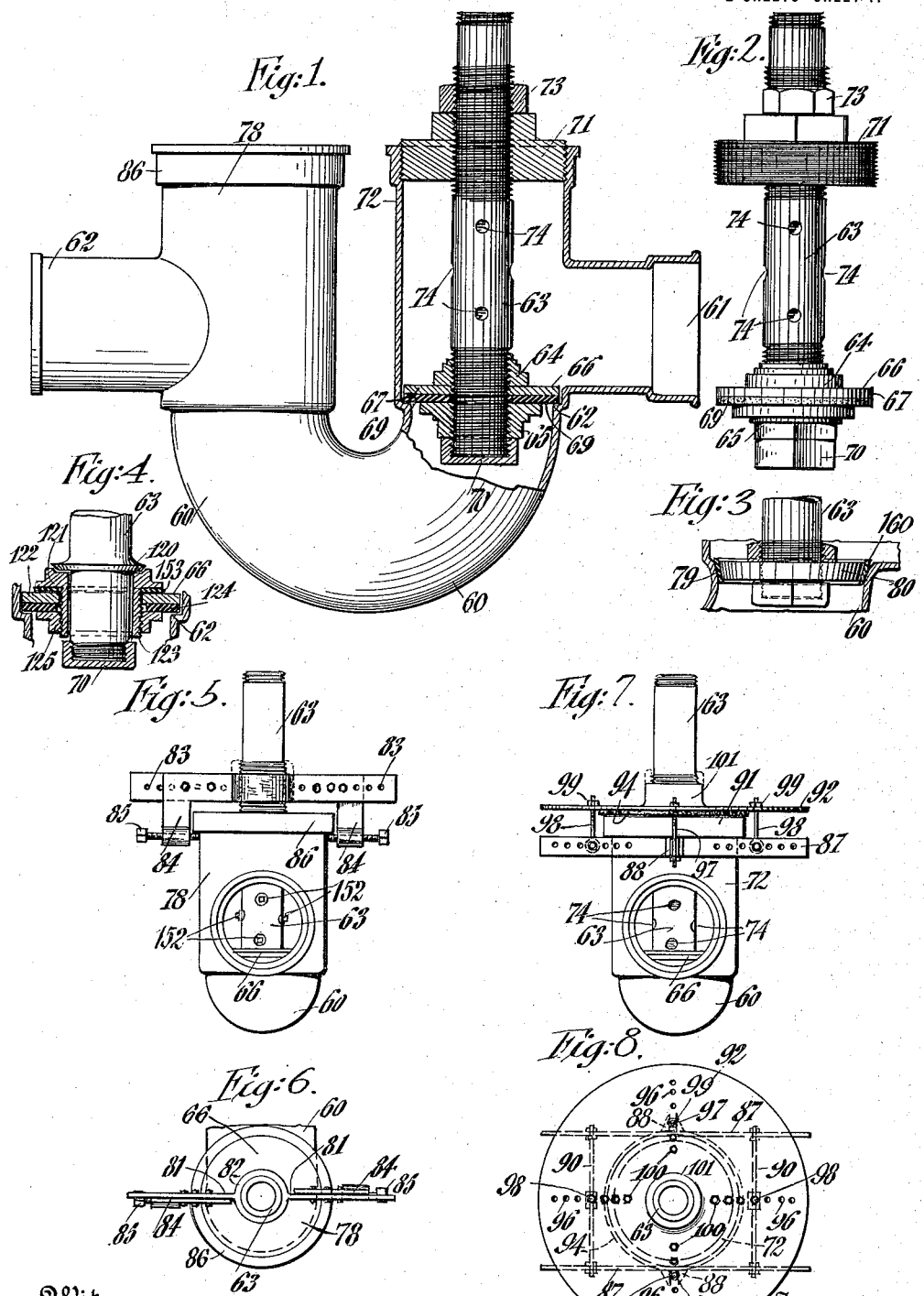

UNITED STATES PATENT OFFICE.

EDWARD KENNEDY, OF NEW YORK, N. Y.

PLUMBING DEVICE.

1,155,820.  Specification of Letters Patent.  Patented Oct. 5, 1915.

Application filed May 18, 1914. Serial No. 839,353.

*To all whom it may concern:*

Be it known that I, EDWARD KENNEDY, a citizen of the United States of America, and a resident of the borough of the Bronx, in the city of New York, in the State of New York, have invented certain new and useful Improvements in Plumbing Devices, of which the following is a specification.

The object of this invention is to provide a trap, and a plug therefor, adapted for testing lines of pipe. For this purpose means are provided for supporting and adjusting the plug in one leg of the trap, water being admitted either above or below the plug, and being held thereby for testing the pipe line above the trap.

In the accompanying drawings, Figure 1 is a side-view partly in vertical central section, of a trap and a plug therefor embodying my invention. Fig. 2 is a side elevation of the plug of Fig. 1. Fig. 3 shows a modified form of plug. Fig. 4 shows another modified form of plug, Fig. 5 shows a clamp adapted for use with the plug of Figs. 1 and 2, said clamp being adapted to be applied to traps of different sizes, Fig. 6 is a top view of Fig. 5. Fig. 7 shows a different form of clamp. Fig. 8 is a top view of Fig. 7. Fig. 9 shows still another form of clamp, Fig. 10 is a top view of Fig. 9. Fig. 11 is a perspective view of one of the clamping bars used in the structures of Figs. 7 to 10, Fig. 12 is a perspective view of a modified form of clamping bar, Fig. 13 shows a lock nut whereby a tight connection of the plug-pipe with the top of the trap is obtained, Fig. 14 is a side elevation of the trap and the pipe connections therefor, all in position for testing the house system, and Figs. 15, 16 and 17 show washers of different sizes adapted to be used with the clamping devices shown, for the purpose of closing the open end of the trap.

Similar reference characters indicate corresponding parts throughout the figures of the drawings.

Referring to the drawings, the arm 61 of the trap 60 is connected with the house system and the arm 62 with the street sewer. The trap is provided with a seat 62 on which rests a plug for closing the trap. Said plug comprises a pipe 63 carrying at its lower end between lock nuts 64 and 65, a stopper 66, which may be made of any suitable material, as for instance, an iron plate or washer 67 and a lead packing 69. A cap 70 closes the lower end of the pipe 63 below the stopper. At its upper portion pipe 63 is threaded and passes through a bushing 71, which is screwed into the vertical arm 72 of the trap 60 at its upper end and closes the same. A lock nut 73 locks the pipe 63 and stopper 66 in whatever position the same are set. The pipe 63 is provided at its body portion within the trap with a plurality of threaded openings 74.

When it is desired to test the house system, water is admitted to the pipe 63 by opening the valve 75 in said pipe (Fig. 14), the valve 76 which is placed in a branch 77 from said pipe 63 to the other vertical arm 78 of the trap being closed. Water thus flows through the pipe 63, out the openings 74, and out through the arm 61 of the trap into the system of pipes which it is desired to test until the same are filled. Valve 75 is then closed. When the test is completed, and it is desired to empty the pipes, this is done by opening valve 76, whereupon the water flows from the house system through the arm 61 and the openings 74 to pipe 63, thence through valve 76, branch pipe 77, arms 78 and 62 of the trap, to the street sewer. The plug described provides a very convenient and ready means for thus testing the house system. For seating the stopper 66 firmly upon its seat 62, before commencing the test, the pipe 63 is given a few turns with a pipe wrench, whereby the same is screwed down in the bushing 71. The lock nut being then also screwed down, firmly holds the parts in their tightened position. After the test, the lock nut is released and the bushing unscrewed and the plug may be removed as a whole. The bushing 71 or a similar bushing is then replaced in the arm 75 of the trap, and a common plug (not shown) is inserted in the bushing so as to close the same, and thereby completely close the trap. For adapting the plug to any trap of different size it is only necessary to change the stopper 66 for another stopper of the proper size. The form of the seat 62 and of the stopper 66 may be varied. A very effective form is shown in Fig. 3, in which the seat 79 is beveled, and the stopper 80 is correspondingly beveled, in such direction as to oppose the pressure of the water above the same. For making the connection tight, the stopper is provided with a rubber packing 160 securely fixed on its beveled edge.

In order to prevent abrasion of the stopper 66 upon the seat 62, which might be caused by any slight roughness in the seat under the high pressure produced by turning the pipe 63 so as to force the stopper down hard upon the seat, the plug may be made in the manner shown in Fig. 4. In this construction the pipe 63 is provided at its lower end with a flange 120 which is adapted to be seated upon the upper concaved face of a bushing 121, which is loose upon the pipe 63 below the flange. Below said bushing 121 is located an iron washer 122. The lead packing or washer 124 which abuts against the seat 62, is located below the washer 122. Below said lead washer there is screwed upon the extension 123 of the bushing a nut 125, which clamps the lead washer firmly against the iron washer 122.
When downward pressure accompanied by rotation of the pipe 63 is produced, the flange 120 bears upon the bushing 121, and inasmuch as the two abutting surfaces of said flange and said bushing are ground to a fair degree of smoothness, flange 120 moves on the bushing and does not rotate the same, and does not rotate the washer 122 or the lead packing 124, owing to the much larger amount of friction existing between the lead and its seat 62, than between the flange 120 and the bushing 121. The stopper thereby does not turn in its seat, and all abrasion and wearing away of the same is prevented, the necessary movement being taken up between the flange 120 and the bushing 121. In Fig. 4 a lead washer 153 is shown between the bushing and the iron washer 122, which serves to additionally tighten the connection. This washer 153 may, however, be omitted.

It is obvious that the plug may be inserted into either the arm 72 or the arm 78 of the trap. When the same is inserted in the arm 78, the pressure of the water is upwardly against the lower face of the stopper 66. In this case no tight closure of the upper end of the arm 78, as by the bushing 71, is required, and said bushing may be dispensed with and the upper end of said arm 78 need have no internal thread, and may be made plain. For the purpose of giving the necessary downward pressure of the stopper 66 upon its seat, however, means must be provided, and such means are shown in Figs. 5 and 6, wherein a cross bar 81 is provided having at its center a threaded annulus 82. The bar is provided with a plurality of openings 83 whereby angular clamping members 84 may be connected to said bar.
At their lower ends each of said clamping members is provided with an inwardly-projecting screw bolt 85 adapted to take at its inner end under the rim or flange 86, at the upper end of the arm 78 of the trap, thus affording the necessary resistance to the upward pressure produced on the bar 81 when the pipe 63 is by means of a pipe wrench or otherwise screwed down so as to firmly seat the stopper 66. It is not necessary that both arms of the trap be made to receive the plug. Either arm may be made to receive the plug, and the other arm may be formed in the usual shape of trap manhole as shown at 150 in Fig. 14.

For testing, when the plug is inserted in the street side (78) of the trap instead of the house side (72) as before described,—the openings 74 are closed by plugs 152 and the cap 70 is removed. The plug in this condition is then inserted in the trap and screwed firmly in place. The upper end of the arm 72 is closed. The pipe 63 of the plug is now connected at its upper end with any suitable source of water under pressure, and the incoming water flows through the pipe 63 and out the lower end of the same and through the trap, and fills the house system to be tested. When the system is filled, the supply of water is shut off. The water in the system is prevented from running back up the pipe 63 by the closing of the valve of the pipe by which it was supplied. When the test is completed, the pipe 63 is backed off so as to lift the stopper from its seat, and the water runs off between the stopper and seat and through the arm 62 of the trap to the street.

Either vertical arm of the trap need not be threaded, but may be merely provided at the upper end of the same with a hub for calking, in the customary manner after testing. For providing means whereby such an unthreaded trap may be closed securely for the purpose of testing, the device shown in Figs. 7 and 8 may be employed. In this structure, two cross bars 87 are employed, one at each side of the arm 72 of the trap, as indicated in dotted lines in Fig. 8. Said cross bars 87 are provided in the middle each with a slotted lug 88, and at each side of said lug with a plurality of openings 89. The cross bars are connected by transverse connecting rods 90, as indicated in dotted lines in Fig. 8, which enter the openings 89 and are secured to the cross bars 87 by nuts, or any other suitable means, so as to hold said cross bars closely underneath the flange or rim 91 at the upper end of the trap. A disk 92 is placed on top of the trap. Between said disk and the top of the trap is located a packing washer 94 which may be made of lead, or of iron and rubber, or any other strong packing material. Traps are customarily made four to ten inches diameter, and the size of washer employed will be such as to best fit the particular size of trap operated upon. Different sizes of such washers, as for instance, 93, 94, 95, are shown in Figs. 16 to 17 inclusive. The disk 92 is provided with a plurality of rows of openings 96, one row crossing each cross bar 87 and connecting rod 90. Bolts 97 are inserted into the slotted lugs 88, and pass upwardly outside of the washer 93, and through one of the openings 96. Eyebolts 98, one at each side of the trap, are secured at their lower ends to the cross bars 90, and likewise pass upwardly outside of the washer 93 and through opening 96 of the plate, and are secured above the same by suitable nuts. It will thus be apparent that by screwing down upon the said nuts 99, the plate 92 is drawn down firmly upon the top of the trap, compressing the washer 93, and making a tight closure at the top of the trap, sufficient to resist testing pressure. The washer 93 is of such strength as to firmly close those openings 96 which are within its scope and located opposite the trap opening, and thereby the escape of water through those openings is prevented. It is obvious also that said openings 96 may be threaded, and plugs inserted therein as indicated at 100 in Fig. 8, in which case the washer may be of cheaper material and less care is needed to see that the same closes the openings. The disk is provided with a hub 101 through which the pipe 63 is screwed for the purpose of tightening the stopper 66 upon its seat. The operation of the devices thus constructed for the purpose of testing is the same as previously described with reference to the construction shown in Fig. 1. When the test is completed, the device is removed by unscrewing the nuts 99, removing the bolts 97 and the eyebolts 98, and then lifting the entire plug out of the top of the trap. The cross bars and the connecting rods are then removed. The top of the trap may thereafter be closed by calking.

In place of the cross bars 87 which are straight throughout their length, a curved cross bar, such as shown in Fig. 12, may be employed. In this case, the curved body portion 102 carries the split lug 88 for the bolts, and is approximately semicircular in shape, having at its ends diametrical lugs 103 with openings to receive cross bolts corresponding to the connecting rods 90. This construction affords a closer hugging of the clamping device underneath the flange 91 of the trap, but has the disadvantage of requiring a special size of bar 102 for each special size of trap and is not adaptable to different sizes of traps, as is the case with the structure shown in Fig. 11.

Another form of clamping device is shown in Figs. 9 and 10, in which the disk, instead of being provided with rows of perforations, is provided with four radial slots 104 in which the securing bolts 105 take, and are adjustable so as to place them as close as possible to the trap flange 91. In this construction the cross bars 87 are employed with the connecting rods 90. The construction is otherwise the same as that previously described for Figs. 7 and 8 and reliance is had upon the washer 94 to close the inner portion of each slot, which is located over the open top of the trap.

Instead of having a plurality of openings in the plate 92, or, slots of great depth, as in plate 106, the plate may have only those four openings 96 necessary to fit it to one size trap, a different plate being furnished for each size of trap. Correspondingly, the slots 104 need be only of such depth as when the bolts 97 are at the inner ends of the slots, to adapt the plate to a trap of certain size, plates having slots of different depths being provided for different sized traps.

In order to provide additional security against any leakage of water at the high pressure employed in testing, a lock nut is provided on the plug. The hub 101 of the disk 106 is extended below the disk as indicated at 107, Fig. 13, and said extension 107 is provided not only with the necessary internal thread for the pipe 63, but is also provided with an exterior thread 108, upon which the lock nut is screwed. The lock nut is firmly screwed up in place against the washer 94, thereby making a tight joint between said washer and the disk, before the plug as a whole is inserted in the trap. The joint having thus been securely tightened, the plug is placed in position in the usual manner, and no escape of water can take place at the joint during testing.

I claim:

1. The combination, with a pipe having a seat in line with one of the vertical arms thereof, of a plug adapted to be inserted through said arm into place upon said seat, means for closing the upper end of the arm and a tubular stem extending through and between said plug and closing means and provided with a lateral opening between them for admitting water to said arm above the plug.

2. The combination with a trap, having a seat in line with one of the vertical arms thereof, of a plug comprising a stopper adapted to engage said seat, means for closing the upper end of said vertical arm, a pipe extending between said stopper and closing means and provided between them with lateral openings and at its upper portion with a thread, and means engaging the thread of the pipe for enabling the same to be screwed downwardly for pressing the stopper upon its seat.

3. The combination with a trap, having a seat in line with one of the vertical arms thereof, of a plug comprising a stopper adapted to engage said seat, a pipe extending upwardly from said stopper and provided at its upper portion with a thread, a disk having openings, a washer between the same and the top of the trap, and adapted to close those openings opposite the top of the trap, and adjustable devices below said disk adapted to engage the flange of the trap, said disk being provided with a hub engaging said pipe for enabling the same to be screwed downwardly for pressing the stopper upon its seat.

4. The combination with a trap having a vertical arm at the street side thereof, and a seat opposite said arm, of a plug insertible through said vertical arm and comprising a stopper and a threaded pipe connected therewith, of a cross bar having a threaded annulus engaging a thread on said pipe, said cross bar being provided at each side of said annulus with a plurality of openings, and clamping members secured to said cross bar in said openings and having each a screw bolt laterally projecting at its inner end beneath the rim of the trap.

5. The combination with a trap, of a plug in the house side thereof, said plug comprising a pipe extending outside of the trap and said pipe being provided with lateral openings within the trap, a branch pipe from said pipe to the street side of the trap, a valve in said branch pipe, and a valve in the said first named pipe above the branch.

6. The combination with a trap having a vertical arm and a seat in line therewith, of a plug adapted to engage said seat and having an upwardly extending pipe, a disk for closing the upper end of the trap, said disk having a hub extending below the body of the disk and having an exterior thread, a lock nut on said extending portion, and a washer between said disk and said lock nut, and screwed by said lock nut into watertight connection with the disk, and means for securing said disk in place at the top of the trap.

7. A plug for traps, comprising a pipe threaded at its lower end, a stopper secured on said threaded portion, a removable screw-cap closing the lower end of the pipe below the stopper, a thread on the upper portion of the pipe, and threaded openings in the pipe between said upper and lower threaded portions.

8. A plug for traps, comprising a pipe having a flange a bushing loosely mounted on the pipe below the flange, and having an exteriorly threaded extension, a stopper on said extension of the bushing, and a lock-nut on said extension, adapted to clamp said stopper against the bushing, said bushing having at its upper face a seat to receive said flange of the pipe, and the abutting surfaces of said seat and flange being smooth, whereby the flange turns on said seat under the pressure of use.

In testimony, that I claim the foregoing as my invention, I have signed my name in presence of two subscribing witnesses.

EDWARD KENNEDY.

Witnesses:
 Jos. Bisband,
 F. Hogg.

Copies of this patent may be obtained for five cents each, by addressing the "Commissioner of Patents, Washington, D. C."